(12) United States Patent
Herndon et al.

(10) Patent No.: US 7,493,695 B2
(45) Date of Patent: Feb. 24, 2009

(54) METHOD FOR DESIGNING A FLUID DYNAMIC BEARING SYSTEM

(75) Inventors: Troy Michael Herndon, San Jose, CA (US); Jeffry Arnold LeBlanc, Aptos, CA (US); Robert Alan Nottingham, Santa Cruz, CA (US); Mohamed Mizanur Rahman, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 167 days.

(21) Appl. No.: 10/792,177

(22) Filed: Mar. 2, 2004

(65) Prior Publication Data

US 2004/0208403 A1 Oct. 21, 2004

Related U.S. Application Data

(60) Provisional application No. 60/464,001, filed on Apr. 18, 2003.

(51) Int. Cl.
*B21D 53/10* (2006.01)
*B23Q 17/00* (2006.01)

(52) U.S. Cl. .................... 29/898.09; 29/407.01

(58) Field of Classification Search ............. 29/898.09, 29/407.01, 407.05, 407.08; 384/100
See application file for complete search history.

(56) References Cited

U.S. PATENT DOCUMENTS

| 4,141,603 | A | * | 2/1979 | Remmers et al. ............ 384/108 |
| 4,696,584 | A | * | 9/1987 | Tielemans ................... 384/307 |
| 4,820,950 | A | * | 4/1989 | Hijiya et al. ................ 310/90.5 |
| 4,934,836 | A | * | 6/1990 | Tanaka et al. ............... 384/100 |
| 5,277,499 | A | * | 1/1994 | Kameyama ................. 384/123 |
| 5,357,163 | A | * | 10/1994 | Minakuchi et al. ........... 310/90 |
| 5,423,612 | A | | 6/1995 | Zang et al. |
| 5,459,674 | A | * | 10/1995 | Ide et al. ....................... 703/1 |
| 5,516,212 | A | | 5/1996 | Titcomb |
| 5,533,812 | A | | 7/1996 | Leuthold et al. |
| 6,118,620 | A | | 9/2000 | Grantz et al. |
| 6,137,650 | A | | 10/2000 | Heine et al. |
| 6,345,913 | B1 | * | 2/2002 | Lee ............................ 384/101 |
| 6,782,338 | B2 | * | 8/2004 | Gonzalez et al. ........... 702/155 |

OTHER PUBLICATIONS

Q. D. Zhang et al. "Design of a Hybrid Fluid Bearing System for HDD Spindles" IEEE Transactions on Magnetics, vol. 35, No. 2, Mar. 1999, pp. 821-826.*
J.A. Vazquez & L.E. Barrett. "Modeling of Tilting-Pad Journal Bearings with Transfer Functions" Intl. J. of Rotating Machinery, vol. 7, No. 1, 2001, pp. 1-10.*

* cited by examiner

*Primary Examiner*—John C Hong
(74) *Attorney, Agent, or Firm*—James Remenick; Novak Druce + Quigg LLP

(57) ABSTRACT

A method of designing an improved bearing system is provided. In one embodiment, the method for designing a fluid dynamic bearing system includes determining a first stability ratio for a first journal bearing configuration. The method further includes determining a second stability ratio for a second journal bearing configuration. In one embodiment, the first configuration has two sub-journal bearings and the second configuration has three sub-journal bearings. The two stability ratios may then be compared to determine whether adding a sub-journal increases the stability ratio of the bearing system.

20 Claims, 5 Drawing Sheets

METHOD FOR DESIGNING A FLUID DYNAMIC BEARING SYSTEM

CROSS-REFERENCE TO RELATED APPLICATIONS

This new application for letters patent claims priority from an earlier filed provisional patent application entitled "Multi-Journal Bearing Motor." That application was filed on Apr. 18, 2003 and was assigned Application No. 60/464,001.

BACKGROUND

1. Field of Invention

The present invention relates to fluid dynamic bearing motors and, more specifically, to a multi-journal fluid dynamic bearing motor assembly.

2. Description of Related Art

FIG. 1 provides a perspective view of a disc drive assembly 150. In this arrangement, a plurality of discs 110' are stacked vertically within the assembly 150, permitting additional data to be stored, read and written. The drive spindle 151 receives the central openings 105 of the respective discs 110. Separate suspension arms 156 and corresponding magnetic head assemblies 158 reside above each of the discs 110. The assembly 150 includes a cover 130 and an intermediate seal 132 for providing an air-tight system. The seal 132 and cover 130 are shown exploded away from the disc stack 110' for clarity.

In operation, the discs 110 are rotated at high speeds about the spindle 151. As the discs 110 rotate, an air bearing slider on the head 158 causes each magnetic head 158 to be suspended relative to the rotating disc 110. The flying height of the magnetic head assembly 158 above the disc 110 is a function of the speed of rotation of the disc 110, the aerodynamic lift properties of the slider along the magnetic head assembly 158 and, in some arrangements, a biasing spring tension in the suspension arm 156.

A servo spindle 152 pivots about pivot axis 140. As the servo spindle 152 pivots, the magnetic head assembly 158 mounted at the tip of its suspension arm 156 swings through arc 142. This pivoting motion allows the magnetic head 158 to change track positions on the disc 110. The ability of the magnetic head 158 to move along the surface of the disc 110 allows it to read data residing in tracks along the magnetic layer of the disc. Each read/write head 158 generates or senses electromagnetic fields or magnetic encodings in the tracks of the magnetic disc as areas of magnetic flux. The presence or absence of flux reversals in the electromagnetic fields represents the data stored on the disc.

Fluid dynamic bearings tend to generate less vibration and non-repetitive run-out in the rotating parts of motors than ball bearings and other types of bearings. For this reason, fluid dynamic bearing motors are oftentimes used in precision-oriented electronic devices to achieve better performance. For example, using a fluid dynamic bearing motor in a magnetic disc drive, such as magnetic disc drive 150 described above in conjunction with FIG. 1, results in more precise alignment between the tracks of the discs and the read/write heads. More precise alignment, in turn, allows discs to be designed with greater track densities, thereby allowing smaller discs and/or increasing the storage capacity of the discs.

As persons skilled in the art are aware, an ongoing challenge in fluid dynamic journal bearings is balancing the tradeoff between motor performance and power consumption. For example, increasing the stiffness of the fluid dynamic journal bearings results in less vibration in a motor's rotating parts and, therefore, increased motor precision and performance. However, an increase in the stiffness of the bearings is usually accompanied by an increase in the power consumption of the motor. Therefore, there exists a need for a technique to increase the stability of a fluid dynamic bearing without increasing the amount of power consumed by the fluid dynamic bearing.

SUMMARY OF THE INVENTION

One embodiment of a method for designing and manufacturing a fluid dynamic bearing system includes determining a first stability ratio for a first journal bearing configuration. The method further includes determining a second stability ratio for a second journal bearing and installing the second journal bearing into the fluid dynamic bearing system. The two stability ratios may then be compared. Preferably, the first configuration has two sub-journal bearings and the second configuration has three sub-journal bearings. A third stability ratio for a third configuration may then be determined if the second stability ratio is greater than the first stability ratio. The third configuration may have four sub-journals.

The disclosed method is especially useful for designing fluid dynamic bearing systems. One advantage of the disclosed method is that a journal arrangement designed according to the disclosed method has substantially greater stability than a journal arrangement not designed according to the disclosed method. Further, neither the radial stiffness nor the power consumption of the journal arrangement designed according to the disclosed method decreases appreciably.

BRIEF DESCRIPTION OF THE DRAWINGS

So that the manner in which the above recited features of the present invention can be understood in detail, a more particular description of the invention, briefly summarized above, may be had by reference to the appended drawings. It is to be noted, however, that the appended drawings illustrate only typical embodiments of this invention and are therefore not to be considered limiting of its scope.

DETAILED DESCRIPTION OF THE PREFERRED EMBODIMENT

Figure 1:
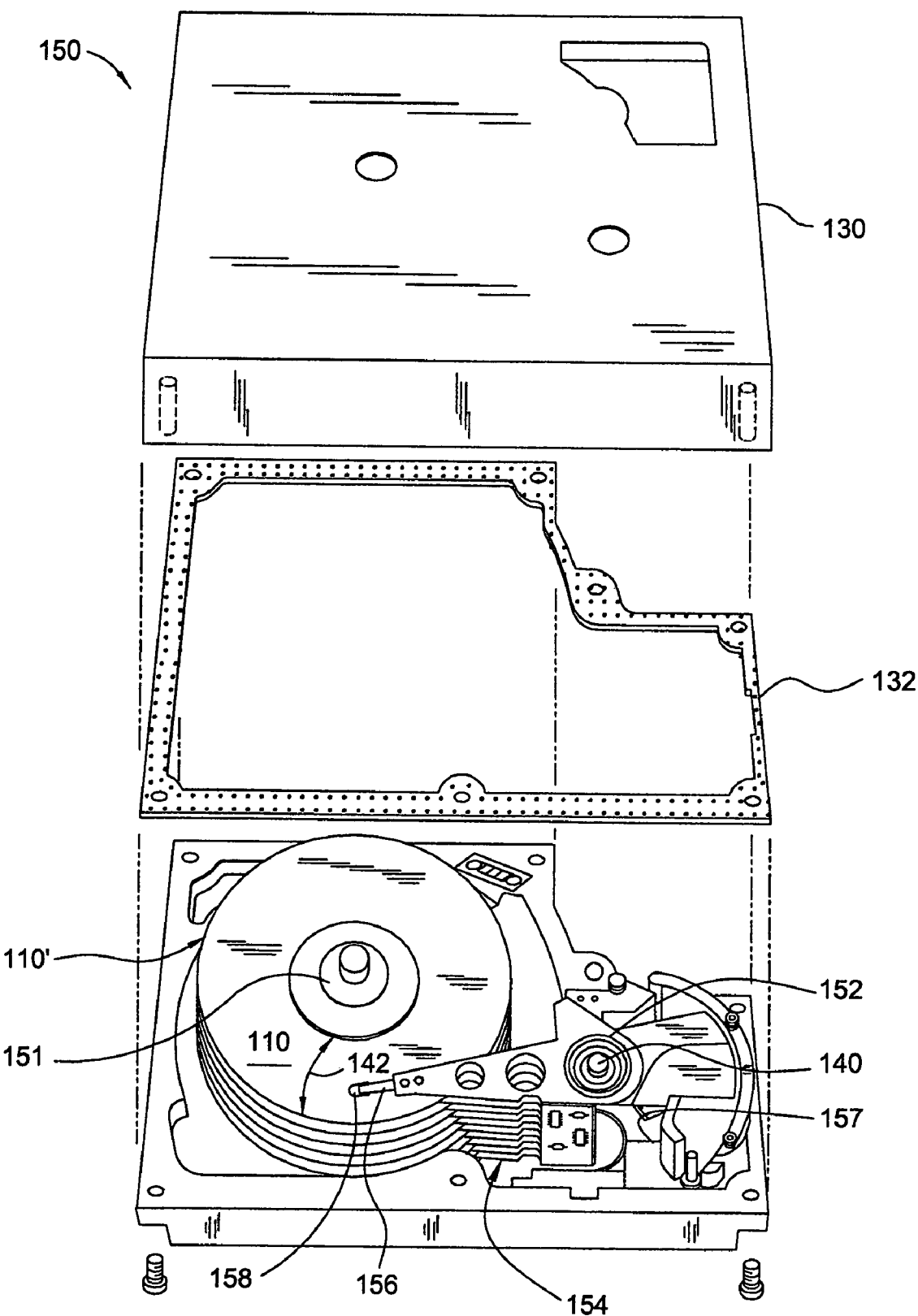
FIG. 1 illustrates a perspective view of an exemplary disc drive assembly as might employ the improved spindle motor arrangement of the present invention.
Figure 2:
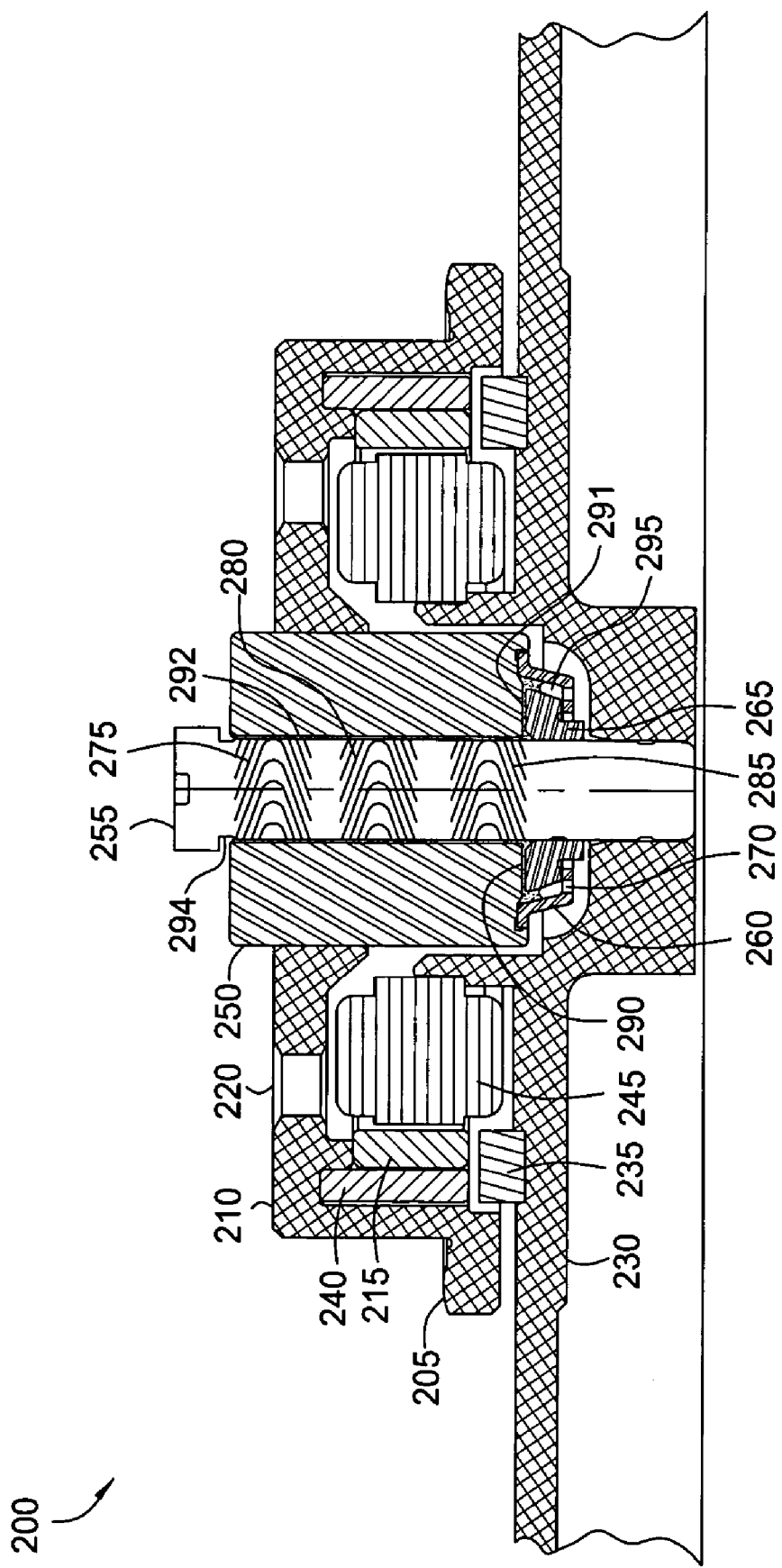
FIG. 2 illustrates a cross-sectional view of an improved spindle motor, according to one embodiment of the invention, in which three distinct journal bearings are provided.

FIG. 2 presents a partial cross-sectional view of an improved spindle motor arrangement 200 in one embodiment, in which three journal bearings 275, 280, and 285 are provided. The motor 200 first comprises a hub 210. The hub 210 includes an outer radial shoulder 205 for receiving a disc (not shown in FIG. 2). Disposed within the hub 210 is a sleeve 250. During operation, the sleeve 250 and hub 210 rotate together. In this arrangement, the sleeve 250 resides and rotates on a non-rotational thrust washer 265. A shaft 255, which is coupled to a base 230, is provided along the inner diameter of the sleeve 250 to provide lateral support to the sleeve 250 while it is rotated. Joined to a bottom surface of the sleeve 250 is a shield 260. The shield 260 encloses an outer portion of the thrust washer 265. Between an inner side of the shield 260 and the enclosed portion of the thrust washer, a gap 295 is formed. The motor 200 also includes a stator 245, which is mounted on a base 230. The stator 245 typically defines an electric coil that, when energized, creates a magnetic field. The energized coil cooperates with magnets 215, which are mounted from an inner surface of the hub 210 on a back iron 240, to cause the hub 210 to rotate relative to the shaft.

As persons skilled in the art will recognize, the motor 200 includes a hydrodynamic bearing system. More specifically, the thrust washer 265 is disposed proximally to a bottom surface of the sleeve 250, and fluid is injected in gaps maintained between the sleeve 250 and surrounding parts, e.g., the shaft 255 and the thrust washer 265, through a fill hole 270 disposed through the shield 260. The fluid defines a thin fluid film that supports relative movement of the parts. The interface between the bottom of the sleeve 250 and the top of the thrust washer 265 thus defines a thrust bearing 290. Liquid lubricant is provided along the thrust bearing gap 291 to provide a fluid bearing surface. Either a top face of the thrust washer 265 or a bottom surface of the sleeve 250 may include a grooved pattern (not shown) for receiving and holding liquid lubricant when the motor 200 is at rest. When the motor 200 is at rest, the sleeve 250 presses directly on the thrust washer 265. Fluid is then extruded around the outer diameter of the shaft 155 and into a shaft-sleeve gap 292 and/or a shield-thrust washer gap 295.

When the motor 200 is energized and the sleeve 250 and adjoining hub 210 are rotated, lubricating fluid is drawn into the thrust bearing region 290 to support relative rotation between the bottom end of the sleeve 250 and the facing surface of the thrust washer 265. To limit the axial displacement of the sleeve 250 and adjoining hub 210 during operation, an axial bias force is typically introduced. In this embodiment, a bias ring 235 is utilized to prevent the thrust bearing gap 290 from becoming too large and reducing the stiffness of the thrust bearing. In such a configuration, an axially downward magnetic force results that pulls magnet 215 (and therefore hub 210) towards base 230. The magnitude of this force is a function of, among other things, the size of a gap between the magnet 215 and the bias ring 235. Alternatively, base 230 may comprise a magnetic metal such as a Series 400 steel or a low carbon steel. In other alternative embodiments, the biasing force may be created in any other feasible way such as, for example, by applying a spring force or a downward-acting pressure force on hub 210. When the rotating sleeve 250 comes to rest, the sleeve end will rest on the thrust washer 265. Although the volume of fluid is very small, it will tend to be forced back out into the gap(s) 295 and/or 292. Therefore, space is preferably allowed in this gap(s) 295 and/or 292 for this fluid. To inhibit the loss of liquid lubricant from the gaps 290 and 292, optional capillary seals are provided along gaps 295 and 294, respectively. When the motor 200 is idle, the capillary seals 295, 294 aid in maintaining fluid within the bearing system.

In addition to thrust bearing 290, FIG. 2 shows that there are three sets of grooves disposed on an outer surface of the shaft 255 along a shaft-sleeve interface 292. The grooved portions of the shaft along with the corresponding outer sections of the sleeve 250 comprise top 275, intermediate 280, and bottom 285 journal bearings, respectively. Upon rotation of the sleeve 250, the grooved patterns of each of the journal bearings 275, 280, 285 create a high pressure region at the center of each pattern to retain fluid and provide stiffness to the motor 200. Although, only one intermediate journal 285 is depicted in FIG. 2, any number of intermediate journals 285 may be provided, depending upon design considerations of a particular motor.

The substantially chevron-shaped groove patterns of the journals 275, 280, and 285 shown in FIG. 2 are preferred but other patterns, such as spiral patterns, would suffice. Preferably, the groove patterns are disposed on the shaft 255, however, they may also be disposed on an inner surface of the sleeve 250. It can seen that the groove patterns are each identical to one another and spaced equidistantly along the shaft 255. This is only a preferred embodiment, however. In alternative embodiments, the journal bearings 275, 280, and 285 may each comprise a different number and configuration of grooves and may be unequally spaced along the gap 292. Further, the grove patterns may overlap one another as long as they are substantially separate, i.e., as long as the apex(es) of each groove pattern is/are longitudinally spaced apart.

It is understood that the motor seen in FIG. 2 is exemplary only. The present invention may be employed in various motor configurations. For example, the motor may be configured so that the shaft is coupled to the hub and rotates around a stationary sleeve.

Figure 3:
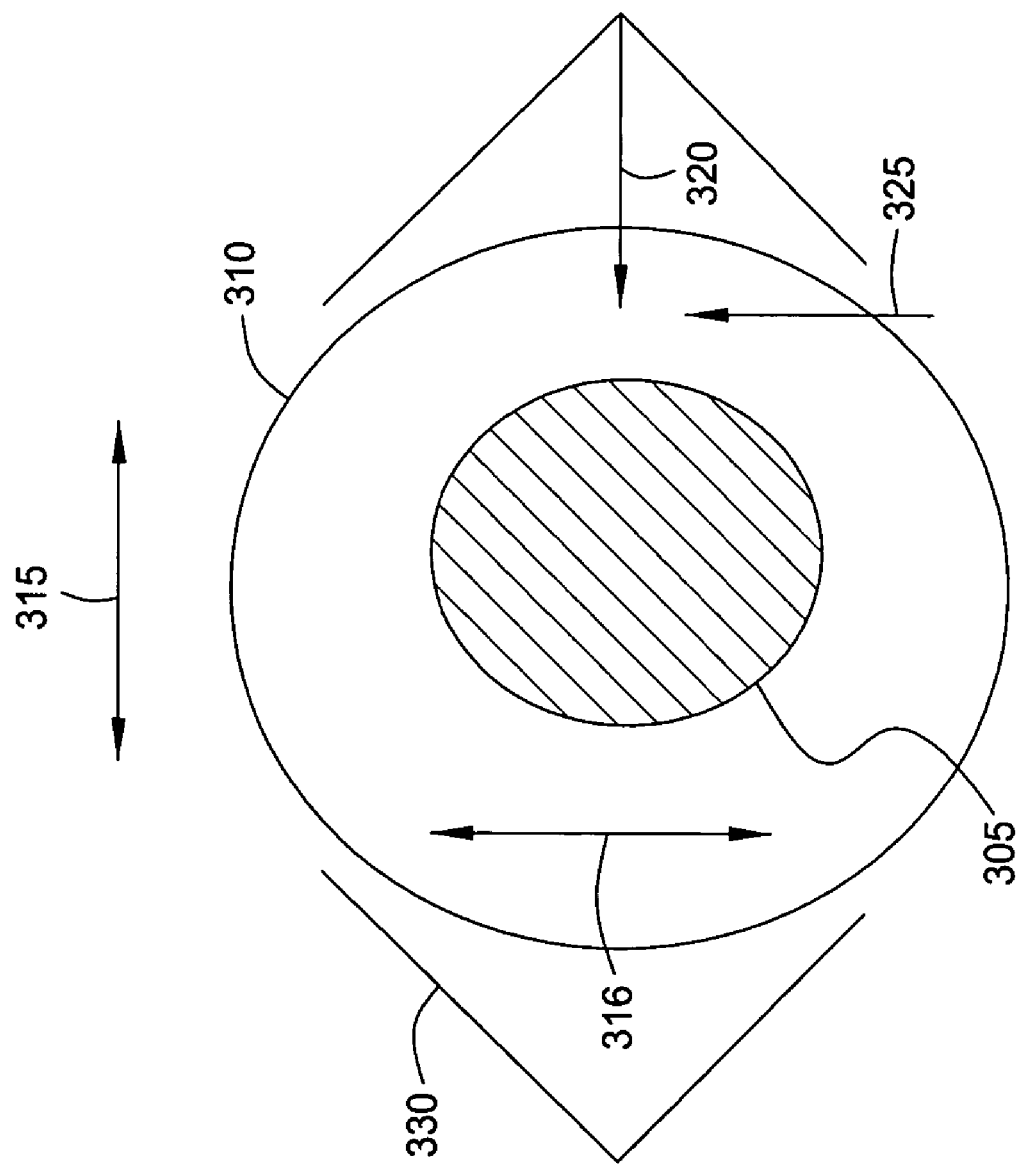
FIG. 3 illustrates the effects of the radial stiffness and the cross-coupled stiffness of a typical fluid dynamic journal bearing on the motion of a shaft, according to one embodiment of the invention.

FIG. 3 illustrates the effects of the radial stiffness 320 and the cross-couple stiffness 325 of a typical fluid dynamic journal bearing 330 on the motion of a shaft 305, according to one embodiment of the invention. As shown, the shaft 305 is subject to an excitation force that causes the shaft 305 to move in the horizontal direction towards a sleeve 310. As a result of this horizontal motion 315, the fluid dynamic journal bearing 330 exerts a force on the shaft 305 in a direction parallel and opposite to the horizontal motion 315. The radial stiffness 320 ($k_{xx}$) of the fluid dynamic journal bearing 330 causes this parallel and opposite reaction force. This type of stiffness is a desirable quality in fluid dynamic journal bearing 330 because the radial stiffness 320 tends to reduce the amplitude of the horizontal motion 315. In addition to the radial stiffness 320, the fluid dynamic journal bearing 330 is configured to have a cross-coupled stiffness 325 ($k_{xy}$), which acts orthogonally to the radial stiffness 320. As persons skilled in the art will understand, the cross-coupled stiffness 325 causes the fluid dynamic journal bearing 330 to exert a force on the shaft 305 in a direction orthogonal to the horizontal motion 315. This orthogonal force, in turn, introduces an orthogonal component 316 to the motion of the shaft 305, thereby decreasing the stability and performance of fluid dynamic journal bearing 330. For this reason, cross-coupled stiffness 325 is not a desirable quality in fluid dynamic journal bearing 330.

The stability of a bearing may be gauged by the radial stiffness divided by the cross coupled stiffness (stability ratio). A high ratio indicates a relatively greater radial stiffness, meaning that the radial stiffness governs the behavior of the shaft more than the cross-coupled stiffness. Thus, with a greater ratio, the propensity of a fluid dynamic journal bearing, through the radial stiffness, to limit the shaft motion outweighs the propensity of the journal, through the cross-coupled stiffness, to add unwanted motion to the shaft.

As persons skilled in the art are aware, shorter journal bearings tend to have greater stability ratios than longer ones. However, simply reducing the length of the journal bearings in a conventional two-journal motor to improve stability would have negative consequences, such as a loss of radial stiffness. In order to obtain the stability benefits of a shorter bearing while not sacrificing the radial stiffness of a longer bearing, the overall journal length of the two-journal motor may be broken into a greater number of sub-journals. Doing this, effectively takes a larger journal with a lower stability ratio and divides it into smaller journals with greater stability ratios. Because these smaller sub-journals act in parallel, the overall effective journal length remains approximately constant, so the radial stiffness remains relatively constant. Further, because the radial stiffness doesn't change, power consumption remains constant (or, more importantly, does not increase). Because smaller-journals with greater stability ratios are used, the effective stability ratio for the overall journal increases, thereby decreasing or masking the influence that the cross-coupled stiffness has on shaft motion.

Figure 4:
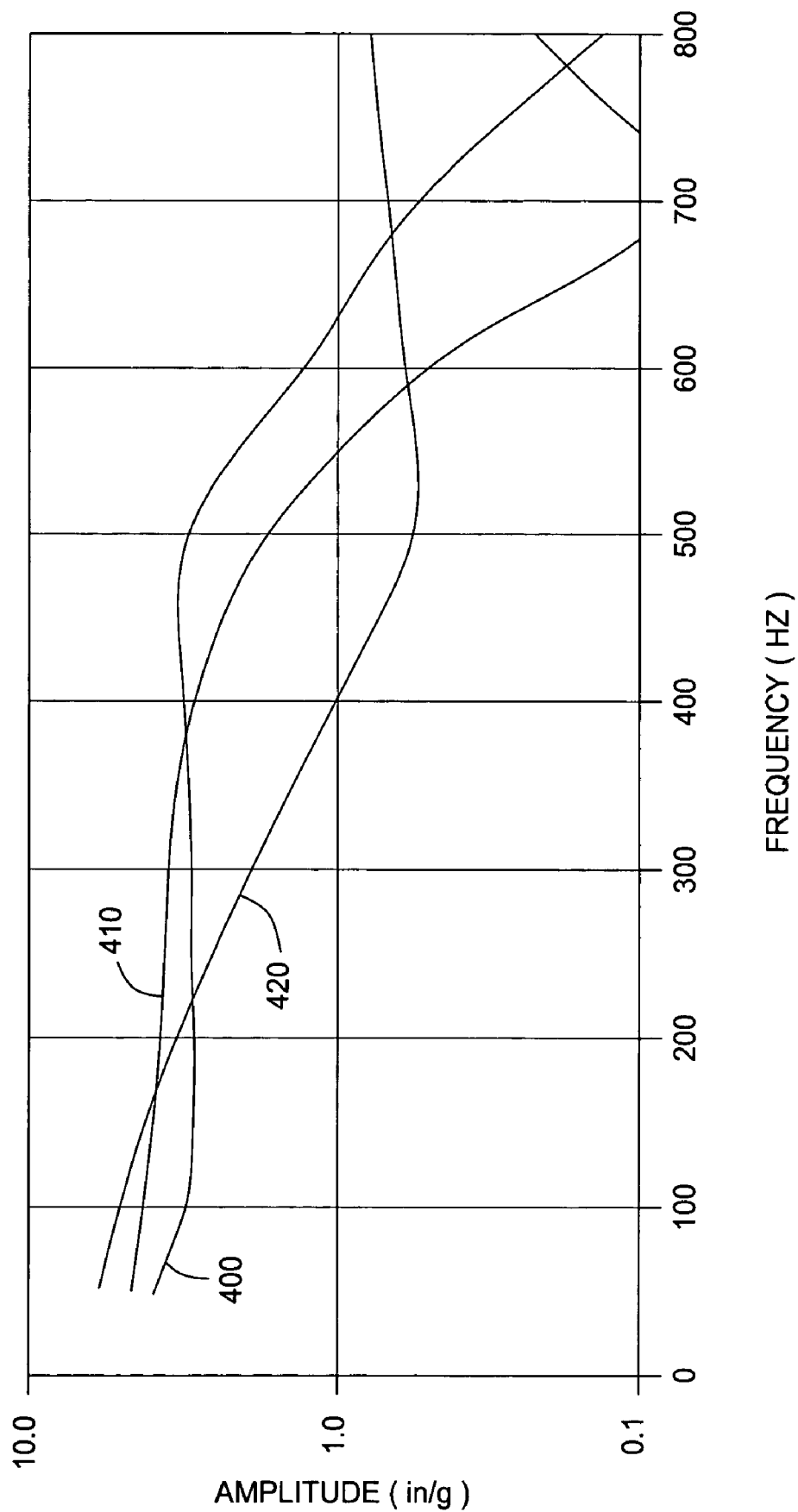
FIG. 4 illustrates the results of a simulation comparing the vibration responses of motors employing two, three, and four journal bearings, according to one embodiment of the invention.

FIG. 4 shows the results of a simulation measuring the response of a fluid dynamic bearing motor with two 400, three 410, and four 420 journal configurations at different operating frequencies, according to one embodiment of the invention. More specifically, the performance of each motor configuration is shown as the operational vibration (op-vibe) of the motor as a function of frequency. The journal gap of each motor configuration is the same. The total journal bearing length of each motor is the same, therefore, power consumption is approximately the same. In each of the three simulations, the total bearing length was divided into two 400, three 410, and four 420 "sub-journals," respectively. As FIG. 4 shows, for frequencies between about 200 and about 600 Hertz, the four-journal configuration 420 exhibits stability superior to either the two 400 or three 410 journal configurations. Further, for frequencies between 400 and about 800 Hertz, the three journal configuration 410 exhibits superior stability to the two journal 400 configuration. The foregoing shows that in certain circumstances, dividing up the total journal length into smaller sub-journals may increase performance without increasing the power consumption of the motor.

Figure 5:
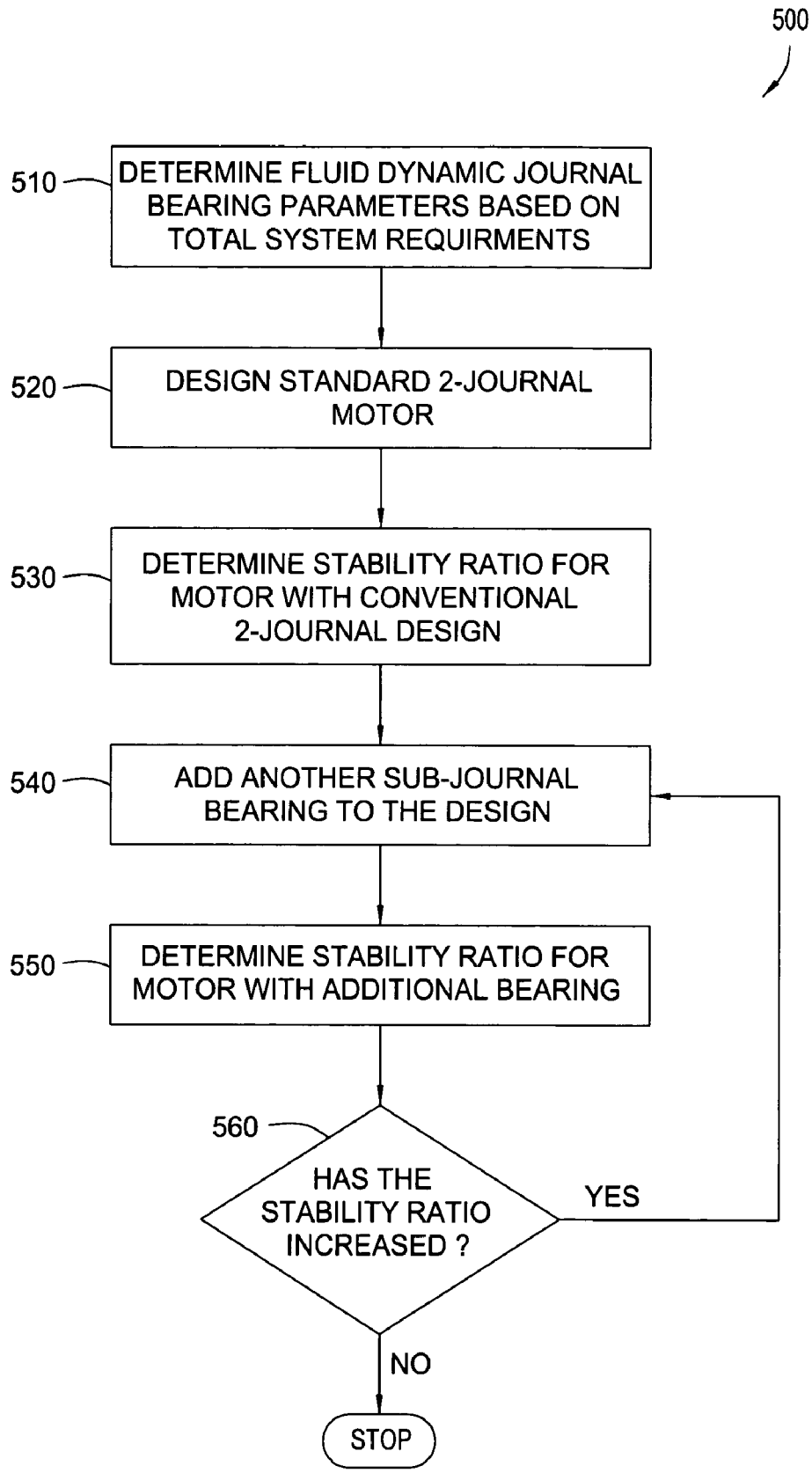
FIG. 5 is a flow chart of method steps for using the stability ratio in the design of a fluid dynamic bearing, according to one embodiment of the present invention.

FIG. 5 is a flow chart of method steps 500 for using the stability ratio in the design of a fluid dynamic bearing, according to one embodiment of the present invention. Although the method steps 500 are described in the context of the systems illustrated in FIG. 1-4, any system configured to perform the method steps in any order is within the scope of the invention.

As shown in FIG. 5, the method of using the stability ratio starts in step 510 where fluid dynamic journal bearing parameters are determined according to total system requirements, such as, for example, power consumption, total radial stiffness, and loading. These requirements are usually supplied by a customer. Typically, these requirements fix bearing parameters, such as the shaft diameter, the journal gap between the shaft and the sleeve, and the total length of the journal bearings.

At step 520, the motor is initially designed with a conventional two journal bearing configuration. At step 530, the stability ratio of the two journal motor is determined. The stability ratio may be determined theoretically or empirically. At step 540, an additional journal bearing is added to the initial two-journal design. Preferably, this is done by taking the total journal bearing length of the two journal design and providing three sub-journals, each one third the length of the total journal bearing length.

At step 550, the stability ratio of the motor with the three journal configuration is determined. As previously discussed herein, decreasing the individual sub-journal bearing lengths may improve the stability ratio of a given motor. There are situations, however, in which this will not be the case. For example, referring back to FIG. 4, it can be observed that for frequencies less than about 200 Hertz, the stability ratio of the two journal configuration is optimal and for frequencies greater than about 600 Hertz and less than about 800 Hertz, the stability ratio of the three journal configuration is optimal. Thus, at step 560, the stability ratio of the three journal design is compared to that of the conventional two journal design to see if the stability ratio has increased by adding another sub-journal. If so, then the method returns to step 540, and the process is repeated until adding an additional sub-journal no longer increases the stability ratio of the motor. At that point, the stability ratio is optimized and the design is concluded. If the stability ratio of the three journal design is not greater than that of the two journal design, then the two journal configuration may be deemed optimal and the design is concluded.

The invention has been described above with reference to specific embodiments. Persons skilled in the art, however, will understand that various modifications and changes may be made thereto without departing from the broader spirit and scope of the invention as set forth in the amended claims.

The invention claimed is:

1. A method for designing and manufacturing a fluid dynamic bearing system, comprising:
determining a first stability ratio for a first journal bearing configuration having at least two sub-journal bearings;
determining a second stability ratio for a second journal bearing configuration having at least three sub-journal bearings, wherein each of the at least three sub-journal bearings provide radial stiffness; and
installing the second journal bearing into the fluid dynamic bearing system to improve the stability of the system.

2. The method of claim 1, wherein each sub-journal bearing of the first configuration has a length equal to substantially one-half of a total journal length and each sub-journal bearing of the second journal configuration has a length equal to substantially one-third of the total journal length.

3. The method of claim 1, further comprising the step of determining a third stability ratio of a third journal bearing configuration.

4. The method of claim 3, wherein the first configuration comprises two sub-journal bearings, the second configuration comprises three sub-journal bearings, and the third configuration comprises four sub-journal bearings.

5. The method of claim 4, wherein each sub-journal bearing of the first configuration has a length equal to substantially one-half of a total journal length, each sub-journal bearing of the second journal configuration has a length equal to substantially one-third of the total journal length, and each sub-journal bearing of the third journal configuration has a length equal to substantially one-fourth of the total journal length.

6. The method of claim 1, wherein the first configuration comprises 2+N number of sub-journals and the second configuration comprises 3+N number of sub-journals.

7. The method of claim 6, further comprising the steps of: determining a third stability ratio of a third journal bearing configuration, the third configuration comprising 4+N number of sub-journals.

8. The method of claim 1, wherein the second stability ratio is greater than the first stability ratio.

9. A method for designing and manufacturing a fluid dynamic bearing system, comprising:
determining a first stability ratio for a first journal bearing configuration having at least two sub-journal bearings;
determining a second stability ratio for a second journal bearing configuration having at least three sub-journal bearings, wherein each of the at least three sub-journal bearings provide radial stiffness; and installing the second journal bearing into the fluid dynamic bearing system to improve the stability of the system is greater than the first stability ratio.

10. The method of claim 9, wherein each sub-journal bearing of the first configuration has a length equal to substantially one-half of a total journal length and each sub-journal bearing of the second journal configuration has a length equal to substantially one-third of the total journal length.

11. The method of claim 9, further comprising the step of determining a third stability ratio of a third journal bearing configuration.

12. The method of claim 11, wherein the first configuration comprises two sub-journal bearings, the second configuration comprises three sub-journal bearings, and the third configuration comprises four sub-journal bearings.

13. The method of claim 12, wherein each sub-journal bearing of the first configuration has a length equal to substantially one-half of a total journal length, each sub-journal bearing of the second journal configuration has a length equal to substantially one-third of the total journal length, and each sub-journal bearing of the third journal configuration has a length equal to substantially one-fourth of the total journal length.

14. The method of claim 9, wherein the first configuration comprises 2+N number of sub-journals and the second configuration comprises 3+N number of sub-journals.

15. The method of claim 14, further comprising the steps of: determining a third stability ratio of a third journal bearing configuration, the third configuration comprising 4+N number of sub-journals.

16. A method for designing and manufacturing a fluid dynamic bearing system, comprising:
    determining a first stability ratio for a first journal bearing configuration having at least two sub-journal bearings;
    determining a second stability ratio for a second journal bearing configuration having at least three sub-journal bearings, wherein each of the at least three sub-journal bearings provide radial stiffness;
    determining a third stability ratio for a third journal bearing configuration; and
    installing the second journal bearing into the fluid dynamic bearing system to improve the stability of the system relative to the first and third stability ratios.

17. The method of claim 16, wherein each sub-journal bearing of the first configuration has a length equal to substantially one-half of a total journal length, each sub-journal bearing of the second journal configuration has a length equal to substantially one-third of the total journal length, and each sub-journal bearing of the third journal configuration has a length equal to substantially one-fourth of the total journal length.

18. The method of claim 16, wherein the first configuration comprises 2+N number of sub-journals and the second configuration comprises 3+N number of sub-journals.

19. The method of claim 18, further comprising the steps of: determining a third stability ratio of a third journal bearing configuration, the third configuration comprising 4+N number of sub-journals.

20. The method of claim 16, wherein the second stability ratio is greater than the first stability ratio.

* * * * *